June 24, 1947.  R. H. WILSON  2,422,871
CHAIN SAW SETTING, JOINTING, AND FILING DEVICE
Filed June 1, 1944  2 Sheets-Sheet 1
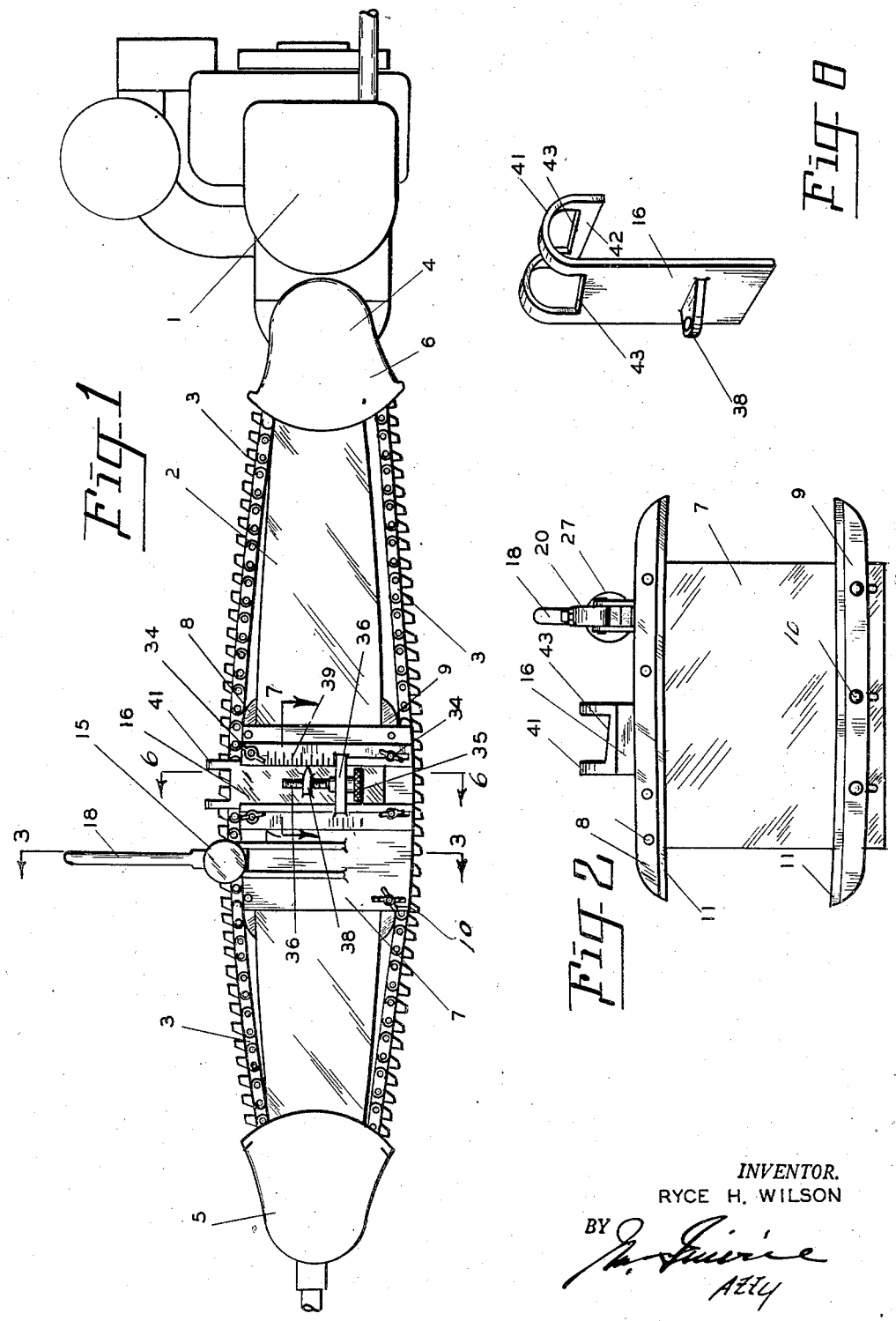
INVENTOR.
RYCE H. WILSON

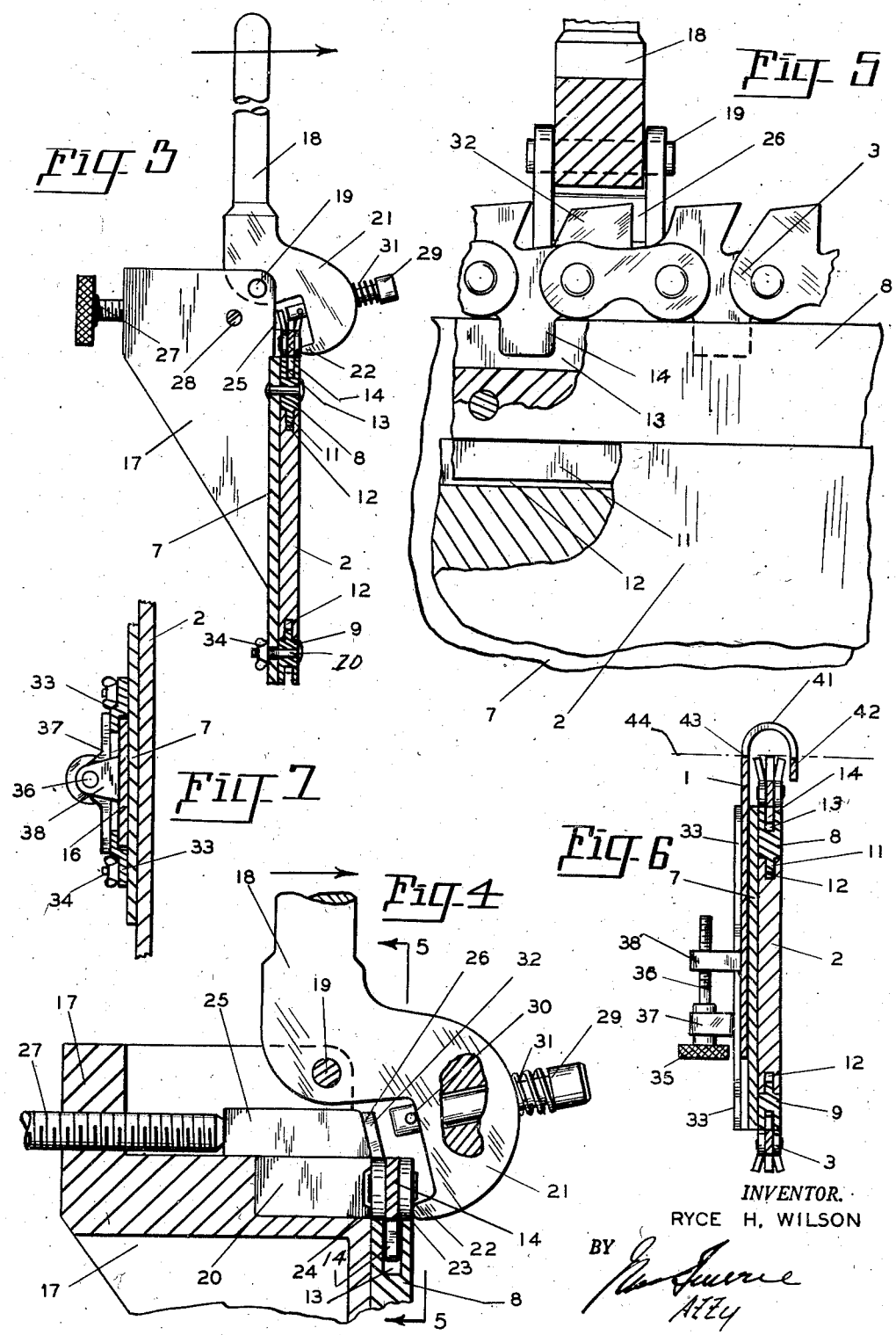

Patented June 24, 1947

2,422,871

UNITED STATES PATENT OFFICE 2,422,871

CHAIN SAW SETTING, JOINTING, AND FILING DEVICE

Ryce H. Wilson, Roseburg, Oreg.

Application June 1, 1944, Serial No. 538,265

5 Claims. (Cl. 76—70)

This invention relates to devices for setting, filing and jointing chain saws, and is particularly adapted for conditioning chain saws without removing them from the frame of the portable saw mechanism.

The primary object of the invention is to attach a saw conditioning device to the saw assembly, said device having a tooth setting unit mounted thereon, together with a tooth jointing gauge for conditioning chain saw teeth while still mounted to the power saw unit.

Other objects of my invention will be apparent in the drawings, specification and claims.

Referring to the drawings:

Figure 1 is a side elevation of a chain saw power unit having my new and improved saw conditioning device mounted thereon.

Figure 2 is a side view of the saw conditioning device removed from the saw.

Figure 3 is a sectional view illustrating the tooth setting unit mounted upon the device which in turn is shown clamped to the saw frame. This view is taken on line 3—3 of Figure 1, looking in the direction indicated.

Figure 4 is a fragmentary enlarged sectional detail view, illustrating the saw setting device.

Figure 5 is a fragmentary side sectional view, taken on line 5—5 of Figure 4 of the saw setting unit.

Figure 6 is a sectional view, taken through the jointing gauge on line 6—6 of Figure 1.

Figure 7 is a fragmentary plan sectional view of the jointing gauge, taken on line 7—7 of Figure 1.

Figure 8 is a perspective view of the jointing gauge removed from the device.

In the drawings:

My new and improved saw conditioning device is illustrated mounted upon the frame of a standard chain power saw, consisting of a motor unit 1, saw frame 2 and chain saw 3. The frame 2 is fixedly mounted to the motor unit 1 at 4 at its one end, and having the idler housing 5 at its opposite end. The saw 3 is driven by a sprocket connected to the motor unit 1 and housed within the housing 6.

My invention consists of mounting a portable frame 7 to the saw frame 2. The frame 7 has a rail 8 fixedly mounted to one of its edges and an adjustable rail 9 secured to its opposite edge by any suitable fastening or locking means, as the wing nuts and bolts 10. The inner edges of the rails 8 and 9 have tongues 11 formed therearound. These tongues engage the grooves 12 of the saw frame 2. The outer edges of the rails have grooves 13 formed therein for receiving the guide links 14 of the chain 3.

The frame 7 of the saw conditioning device is mounted to the saw frame 2 by removing the saw 3 from the groove 12 a sufficient distance to permit the insertion of the rail 8 underneath the chain registering its tongue 11 within the groove 12 of the frame 2, after which the rail 9 is brought into position on the opposite side of the frame 2 between the saw and the frame and locked in place by the wing nuts 10. The saw 3 will then travel over the rails, having its guide links 14 running through the grooves 13, past the saw setting unit 15 and jointing gauge 16.

The saw setting unit consists of a bracket 17 mounted to the side of the frame 7 and having a lever 18 pivotally mounted thereto at 19. Mounted within the frame is a stop block 20 past which the chain 3 moves. This stop block may be any given length depending upon the thickness of the chain being processed. Formed as part of the lever 18 is a goose neck portion 21, having its lower extremity 22 contacting the outer edge of the chain 3 at 23, forcing the chain links against the face 24 of the stop block 20 and securely holding the chain in fixed position when the lever 18 is moved in the direction of the arrow shown in Figures 3 and 4.

Adjustably mounted within the bracket 17 is a movable die or anvil 25. This die has a face 26 which may be formed at any desired angle depending on the type of tooth setting required, this die is interchangeable. The die 25 is positioned relative to the saw by the hand screw adjustment 27 and is locked in a fixed position by the set screws 28, within the frame 17. A setting punch 29 is slidably mounted within the goose neck 21 and is held in place by the pin 30. A spring 31 holds the punch in retracted position as shown in Figures 3 and 4. When the tooth 32 registers with the face 26 of the die 25 the punch 29 is struck with a hammer, setting the tooth against the face of the die 25. This is done when the chain is held in fixed position as heretofore described.

I will now describe the method of gauging and jointing the teeth of the saw. A jointing gauge 16 is slidably mounted under the guideways 33, which are mounted to the frame 7 by suitable holding means, as bolts and wing nuts 34. The height of the gauge may be adjusted by the hand wheel 35 and screw 36. The screw and hand wheel are held in a fixed position by the bracket 37, which is fixedly mounted to the guideways 33 and being threaded within the bracket arm 38 which forms part of the jointer gauge 16. Suitable calibrations 39 indicate the height of the gauge 16 relative to the saw teeth. The gauge 16 consists of the main body portion having a goose neck 41 formed on its upper end for supporting the guide bar 42 for matching the top edge 43 of the gauge. The guide bar 42 may be at a raised elevation relative to the edge 43, providing for the filing of the tooth at an angle. When jointing the teeth of the saw the file is guided along the broken line 44, illustrated in Figure 6.

In Figure 6 I illustrate a straight across filing, but the guide line 44 may take any desired angle depending on the design of tooth jointing required. The gauges 16 may be readily removed and replaced by gauges of different jointing angles by backing off the hand wheel 35 and removing the gauge. Sufficient space around the rails 8 and 9 are provided for free hand filing of the teeth, the rails holding the teeth in a fixed position relative to the device.

As stated before in order to condition the chain saw my new and improved setting, filing and jointing device is clamped to either side of the saw frame depending on which set of teeth are to be conditioned, processing the teeth along one side of the saw first, then the device is moved to the opposite side of the saw frame completing the reconditioning of the saw without removing the saw chain from the saw frame.

I do not wish to be limited to the exact mechanical construction herein illustrated and described, as other forms of mechanical equivalents may be substituted still coming within the scope of my claims.

What is claimed is:

1. A saw chain supporting and cutting tool guiding device comprising a frame formed with a channel to receive and guide the saw chain carrying the saw teeth, a plate, means for securing the plate to the frame, an element adjustably carried by said plate and provided with guiding surfaces adapted to support and guide a cutting tool when moved transversely of the saw teeth and means for adjusting the element relative to the plate to move the guiding surfaces toward and from the saw chain and frame.

2. A saw chain supporting and cutting tool guiding device comprising, a pair of spaced channels to receive and guide opposite flights of the saw chain carrying the saw teeth, a plate bridging the space between the channels, means for securing the plate to the channels, an element adjustably carried by said plate and provided with guiding surfaces adapted to support and guide a cutting tool when moved transversely of the saw teeth, and means for adjusting the element relative to the plate to move the guiding surfaces toward and from the saw chain and one of said saw receiving channels.

3. In a device as claimed in claim 2, the means for securing at least one of said channels to the plate being adjustable.

4. A saw chain supporting and cutting tool guiding device adapted to be mounted on the chain guiding frame of a chain sawing machine comprising, a pair of spaced channels to receive and guide opposite flights of the saw chain carrying the saw teeth, said channels having tongues to seat in the saw chain guide grooves of the saw frame, a plate bridging the space between the channels, means for securing the plate to the channels, an element adjustably carried by said plate and provided with guiding surfaces adapted to support and guide a cutting tool when moved transversely of the saw teeth, and means for adjusting the element relative to the plate to move the guiding surfaces toward and from the saw chain and one of said saw receiving channels.

5. In a device as claimed in claim 4, the means for securing at least one of said channels to the plate being adjustable.

RYCE H. WILSON.

REFERENCES CITED

The following references are of record in the file of this patent:

UNITED STATES PATENTS

| Number | Name | Date |
|---|---|---|
| 1,088,941 | Swainston | Mar. 3, 1914 |
| 1,199,918 | Parker | Oct. 3, 1916 |
| 1,770,324 | Ross | July 8, 1930 |
| 789,560 | Olsen | May 9, 1905 |
| 818,195 | Roach | Apr. 17, 1906 |
| 887,694 | Roach | May 12, 1908 |
| 1,834,237 | Covell | Dec. 1, 1931 |
| 1,132,379 | Paulson | Mar. 16, 1915 |
| 594,000 | Frederickson et al. | Nov. 23, 1897 |
| 604,574 | Arnold | May 24, 1898 |
| 695,135 | Baggs et al. | Mar. 11, 1902 |
| 1,088,941 | Swainston | Mar. 3, 1914 |
| 1,199,918 | Parker | Oct. 3, 1916 |